United States Patent [19]  [11]  4,376,294
Meier et al.  [45]  Mar. 8, 1983

[54] HEAD LOADING AND RETRACTION APPARATUS FOR MAGNETIC DISC STORAGE SYSTEMS

[75] Inventors: Markus Meier, Carpinteria; David A. Sutton, Santa Ynez, both of Calif.

[73] Assignee: DMA Systems Corporation, Goleta, Calif.

[21] Appl. No.: 321,884

[22] Filed: Nov. 16, 1981

[51] Int. Cl.³ .......................... G11B 21/02; G11B 5/54
[52] U.S. Cl. .................................................... 360/105
[58] Field of Search ............................. 360/103–105, 360/97.99, 102, 86, 133, 135

[56] References Cited

U.S. PATENT DOCUMENTS

| | | | |
|---|---|---|---|
| 3,678,482 | 7/1972 | Billawala | 360/105 X |
| 3,896,495 | 7/1975 | Beecroft | 360/105 X |
| 3,984,872 | 10/1976 | Beecroft | 360/103 |
| 4,120,010 | 10/1978 | Mitsuya et al. | 360/103 |
| 4,206,489 | 6/1980 | Manzke et al. | 360/105 |
| 4,209,813 | 6/1980 | Bryer et al. | 360/105 |
| 4,247,877 | 1/1981 | Keller et al. | 360/105 |
| 4,253,125 | 2/1981 | Kanamuller | 360/99 |
| 4,302,789 | 11/1981 | Vos | 360/105 |
| 4,309,732 | 1/1982 | Kronfeld et al. | 360/105 X |
| 4,315,292 | 2/1982 | Kronfeld | 360/104 X |

Primary Examiner—John H. Wolff
Attorney, Agent, or Firm—Spensley, Horn, Jubas & Lubitz

[57] ABSTRACT

Apparatus for supporting a magnetic head assembly adjacent a recording surface and for loading and retracting the head assembly. The apparatus comprises a rigid, cantilevered support arm; a thin, resilient, gimbal sheet attached to the free end of the support arm; a magnetic head assembly including a tranducing element carried by the gimbal sheet; a lift bail mounted on the head assembly; a spring-loaded force arm rotatably attached to the support arm for applying a force to the head assembly on the side thereof opposite to the transducing side thereof; a lifting finger attached to the force arm at the point where the force arm engages the head assembly, the lifting finger extending into but not engaging the lift bail when the force arm is engaging the head assembly; a pivot arm for engaging the force arm and for moving the force arm out of contact with the head assembly, the lifting finger engaging the lift bail when the force arm is moved for retracting the head assembly from the recording surface; and a centrally mounted actuator arm including a caming surface for operating the pivot arm when the support arm is retracted so as to provide for a symmetrical lift force in a space saving design.

10 Claims, 12 Drawing Figures

HEAD LOADING AND RETRACTION APPARATUS FOR MAGNETIC DISC STORAGE SYSTEMS

BACKGROUND OF THE INVENTION

1. Field of the Invention

The present invention relates to a loading and retraction apparatus for magnetic disc storage systems and, more particularly, to a loading and retraction apparatus which permits separation of function between load/retract and flying and which provides for a symmetrical lift force in a space saving design.

2. Description of the Prior Art

Magnetic disc storage systems are widely used to provide large volumes of relatively low cost computer-accessible memory or storage. A typical disc storage device has a number of discs coated with a suitable magnetic material mounted for rotation on a common spindle and a set of transducer heads carried in pairs on elongated supports for insertion between adjacent discs, the heads of each pair facing in opposite directions to engage opposite faces of adjacent discs. The support structure is coupled to a positioner motor, the positioner motor typically including a coil mounted within a magnetic field for linear movement and oriented relative to the discs to move the heads radially over the disc surfaces to thereby enable the heads to be positioned over any annular track on the surfaces. In normal operation, the positioner motor, in response to control signals from the computer, positions the transducer heads radially for recording data signals on or retrieving data signals from a preselected one of a set of concentric recording tracks on the discs.

As the density at which digital information is recorded on a magnetic recording surface is increased, the gap between the recording head and the magnetic recording surface must be decreased. The smaller the gap and the closer the magnetic head is positioned with respect to the recording surface, the more difficult it becomes to control the mechanical tolerances of the structure mounting the recording head. To overcome these mechanical difficulties, magnetic recording heads are placed in head assemblies adapted for floating on a thin film of air created by the laminar air flow due to the rotation of the recording surface. Modern magnetic disc drives incorporate rigid substrate discs, the surfaces of which are polished to a high finish so that the head can reliably fly on the air bearing. Systems are presently being designed wherein the heads fly above the disc recording surfaces at heights of less than 20 microinches.

In such systems, when the recording medium rotates, the laminar air flow causes the head assembly to be forced away from the medium. Therefore, some urging means, such as a spring, must be provided to overcome this air flow and counterbalance the head assembly, keeping it as close to the recording medium as possible. Furthermore, floating magnetic recording head assemblies are often mounted in gimbal mounting devices in order to allow the angle and position of the magnetic recording head assembly to conform to the air bearing.

The head suspension is generally a six-degree-of-freedom system. These six degrees are rotation and translation about two orthogonal axes (roll and pitch) parallel to the recording surface and the axis normal thereto. A typical mount has a very low spring rate for rotation of the head about any axis parallel to the recording surface. The spring rate for translation along an axis normal to the recording surface must be controlled quite closely to maintain the proper head-to-surface clearance. On the other hand, the head should be mounted so as to have very high spring rates for translation of the head parallel to the recording surface and in rotation about an axis normal to it.

The most effective apparatus used heretofore for achieving the desired result employs a gimbal sheet formed from a single, thin, approximately square, piece of resilient material, such as steel, for attaching a transducer head to a head arm. The head arm is a cantilevered member which is as rigid as possible to prevent any appreciable deflection of it during operation. The periphery of the gimbal sheet is attached at mounting points on its opposite edges to a side of the cantilevered head arm end so as to be positioned generally parallel to an adjacent recording surface. The head itself is attached to the center of the gimbal sheet.

Typical gimbal sheets and head arms are disclosed in U.S. Pat. No. 3,896,495 to Beecroft and U.S. Pat. No. 4,206,489 to Manzke et al. In these patents, as in virtually all other known mechanisms, a bias is applied to the gimbal sheet in such a way that it normally retracts the head assembly from the disc surface. This bias force is overcome by a separate load force mechanism when the head is in its flying condition. This requires the head assembly to be lifted off the disc surface by a retract force applied to the center of force of the air bearing. Any attitude control (pitch and roll of the air bearing) will be supplied by bias induced in the gimbal sheet. Since the gimbal sheets presently dealt with are very flimsy, any attitude controlling forces will be very small.

In other words, when the retract force is provided by a bias in the gimbal sheet, the retract force is limited to the force that can be developed by the structure of the gimbal sheet itself. Furthermore, when the gimbal sheet is biased, it may effect its attitude and this would be highly undesirable. Accordingly, the most desirable situation would be to permit separation of the functions between load and retract and flying. Thus, it would be desirable to eliminate all bias forces from the gimbal sheet and make the gimbal sheet totally flat. The load force for flying should be totally independent from the retract force.

Another problem encountered in the prior art results from the fact that prior art mechanisms for ramp loading magnetic flying heads onto a rotating magnetic disc having typically employed a ramp mechanism located on the outside edges of the head support arm. This has been thought to be convenient since the ramp can interact with an externally mounted cam surface to provide the load/unload action. The Beecroft and Manzke et al patents depict this type of external cam and follower ramp design. Vertical motion, required to lift the head from the disc surface, is provided by this combination.

Several problems are present in this implementation of ramp loading. In the device of Manzke et al, the external ramp and cam is provided on one side only of the cantilevered arm so that the action of lifting the ramp follower causes a twisting torque to be applied to the structure which will cause a pitch angle to be transmitted to the air bearing head. This pitch variation can be a troublesome variable which affects reliable head load/retract. Depending upon whether a particular arm has a head that is flying up or one that is flying down, the pitch can be positive or negative. With multiple head systems, one ends up with multiple different versions of twisting which causes pitch variations in the head and significant problems in manufacture to optimize the design around multiple different operating points.

To solve this problem, the Beecroft patent shows a symmetrical, twin ramp design with ramps on both sides of the cantilevered arm. This is done to overcome the problem previously mentioned since no twisting is emparted to the structure by the symmetrical lift. The problem, however, is that the arm width is now increased by the addition of two external cam surfaces. Another problem is in aligning the two cam surfaces exactly so that both cams touch the head arm at the same time in order to avoid twisting of the arm (as occurs with a single ramp/cam surface). The recent trend in the industry toward higher storage capacity in smaller packages makes space saving a prime design constraint and virtually eliminates from practical modern systems the additional width which results from two external cam surfaces.

SUMMARY OF THE INVENTION

According to the present invention, there is provided an apparatus for supporting a magnetic head assembly adjacent a recording surface, and for loading and retracting the head assembly, which solves these problems in a manner unknown heretofore. According to the teachings of the present invention, a gimbal sheet and a cantilevered arm are used to support a head assembly above a recording surface. A spring-loaded arm is provided for applying a force to the head assembly to counteract the force provided by the air bearing. However, with the present design, the load force for flying is totally independent from the retract force and all bias forces from the gimbal sheet are removed. This permits the gimbal sheet to be totally flat. Furthermore, the retract force can be spaced from the center of force of the air bearing to allow the head to be removed nose up.

The present assembly for ramp loading the magnetic flying heads onto the rotating magnetic disc does not have a ramp mechanism located on the outside edges of the head support arm. The present invention employs a caming surface on an actuator arm mounted on the centerline of the head support arm. As a result, there is now a symmetrical lift force so that there is no twisting imparted to the head support arm. Furthermore, space conservation is maximized since no additional arm width is required for external cams and followers.

Briefly, the present apparatus for supporting a magnetic head assembly adjacent a recording surface and for loading and retracting the head assembly comprises a rigid cantilevered support arm; a thin, resilient, gimbal sheet attached to the free end of the support arm; a magnetic head assembly including a transducing element carried by the gimbal sheet; a lift bail mounted on the head assembly; a spring-loaded force arm rotatably attached to the support arm for applying a force to the head assembly on the side thereof opposite to the transducing side thereof; a lifting finger attached to the force arm at the point where the force arm engages the head assembly, the lifting finger extending into but not engaging the lift bail when the force arm is engaging the head assembly; a pivot arm for engaging the force arm and for moving the force arm out of contact with the head assembly, the lifting finger engaging the lift bail when the force arm is moved for retracting the head assembly from the recording surface; and a centrally mounted actuator arm including a caming surface for operating the pivot arm when the support arm is retracted so as to provide for a symmetrical lift force in a space saving design.

OBJECTS, FEATURES AND ADVANTAGES

It is therefore the object of the present invention to solve the problems encountered heretofore in providing a head loading and retraction mechanism for magnetic disc storage systems. It is a feature of the present invention to solve these problems by providing a load/unload mechanism which permits separation of function between load/retract and flying and which provides a symmetrical lift force in a space saving design. An advantage to be derived is the elimination of all bias forces from a head support gimbal sheet. A further advantage is the ability to make a gimbal sheet flat. A still further advantage is the separation of functions between load and retract and flying. Another advantage is a load force which is totally independent from a retract force. Still another advantage is a symmetrical lift force. An additional advantage is the elimination of any twisting imparted to any structure. Another advantage is the elimination of additional arm widths for external cams and followers.

Still other objects, features and attendant advantages of the present invention will become apparent to those skilled in the art from a reading of the following detailed description of the preferred embodiment constructed in accordance therewith, taken in conjunction with the accompaning drawings wherein like numerals designate like parts in the several figures and wherein:

DESCRIPTION OF THE PREFERRED EMBODIMENT

Referring now to the drawings, there is shown apparatus, generally designated 10, for supporting a magnetic transducer assembly 13 adjacent a recording surface 11 for transcribing thereon. Recording surface 11 is on one side of a disc 12 which typically has a magnetic material coated on either one or both surfaces thereof to enable data to be magnetically recorded thereon. Disc 12 would be mounted on a spindle (not shown) which is driven by a spindle motor (not shown) which rotates disc 12 about an axis defined by the spindle.

Figures 1, 3, 5:
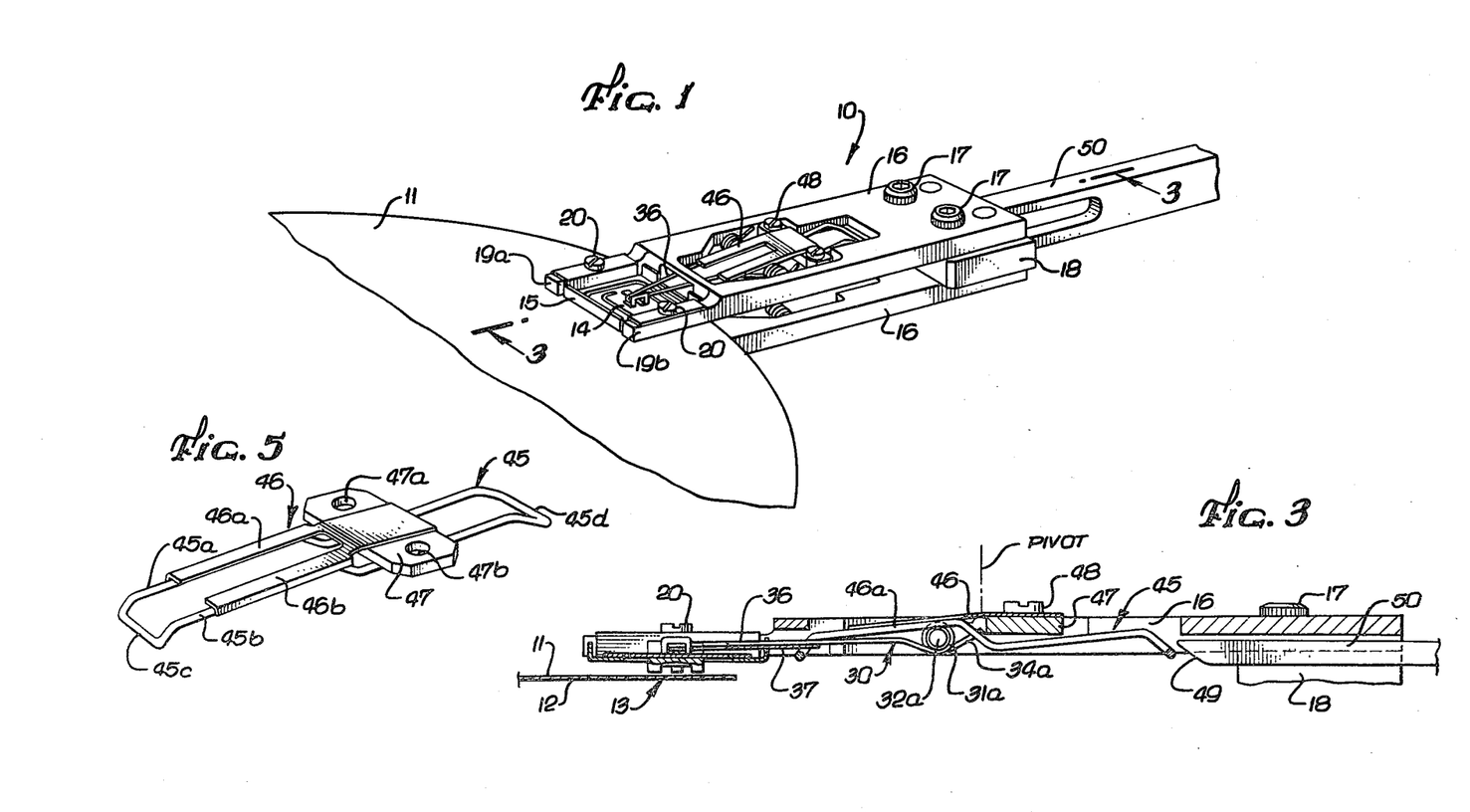
FIG. 1 is a perspective view of a magnetic disc storage system showing the magnetic head assembly and supporting apparatus in operative position relative to a recording media.
FIGS. 3 and 4 are sectional views taken along the line 3—3 in FIG. 1 and showing the head assembly in its loaded and fully retracted positions, respectively.
FIG. 5 is a perspective view of the lift wire and flexure.
Figure 2:
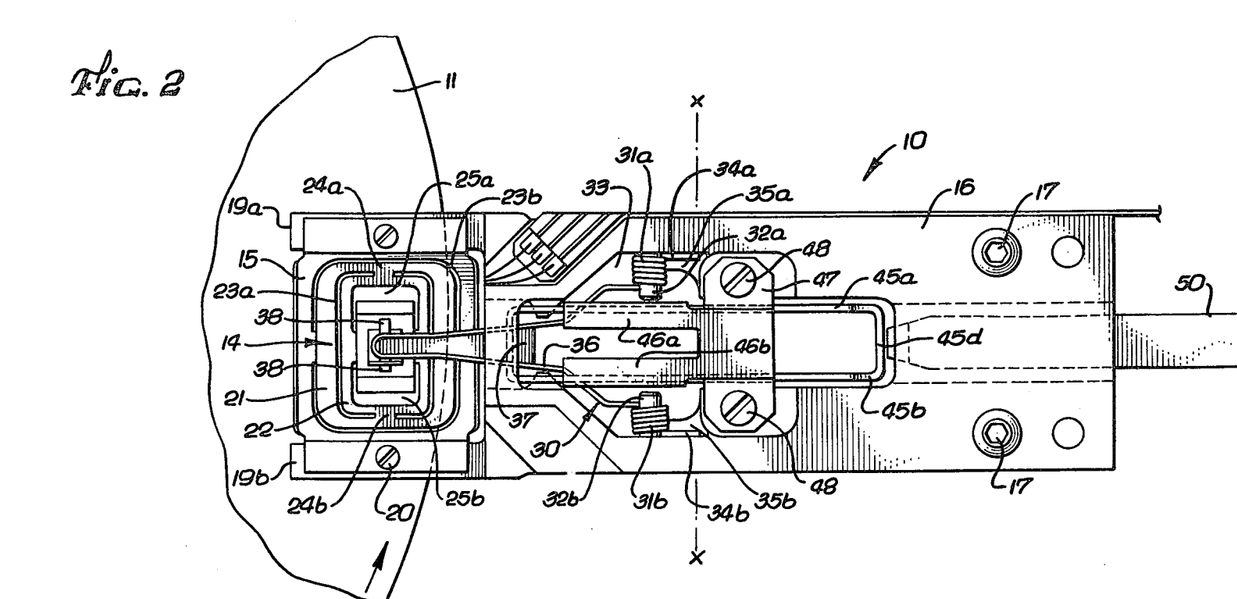
FIG. 2 is an enlarged top plan view thereof.

Data is recorded on disc surfaces 11 by signals applied to a transducer element 28 (FIGS. 9 and 12), typically referred to as a "head", to be described more fully hereinafter. Head 28 is mounted in a slider 27, mounted in the center of a thin, resilient member or gimbal sheet 14 (FIG. 2). Gimbal sheet 14 is connected by a frame 15 to the free end of a rigid cantilevered arm, generally designated 16. As shown in FIG. 1, multiple arm/head assemblies can be mounted in facing relationship to transcribe data on the opposite surfaces 11 of disc 12, all of the arms 16 being connected to a common carriage (not shown). The carriage is typically physically coupled to a positioner coil (not shown) of a linear positioner motor (not shown) which, in response to the application of positioning signals thereto, is capable of linearly moving the support radially over surfaces 11. This permits head assembly 13 to be selectively positioned over any one of a plurality of annular recording tracks defined on disc recording surface 11.

In normal operation, that is, when heads 28 are writing data onto or reading data from surfaces 11 of disc 12, the heads will be loaded. When a head is loaded, it simply means that a spring force is acting upon the head, as will be described more fully hereinafter, to urge head assembly 13 toward surface 11 of disc 12. This force is counteracted by an air cushion caused by the rapid rotation of disc 12 so that head assembly 13 actually flies immediately above surface 11. In magnetic disc drives, head assembly 13 may fly at distances of less than 20 microinches above surface 11.

The present invention deals with the means for supporting head assembly 13 above surface 11, for applying the force thereto, and for withdrawing head assembly 13 from surface 11 so that arm 16 may be retracted past the edge of disc 12 to enable disc 12 to be removed from the magnetic storage system. Retraction of arm 16 is also important to insure that head assembly 13 does not land on recording surface 11 in the event disc 12 stops rotating, which might cause damage to head assembly 13 or disc 12 or both.

Support arm 16 comprises a rigid beam which carries the apparatus for positioning head assembly 13 adjacent surface 11 and for lifting head assembly 13 away from surface 11 of disc 12. In general, the more rigid arm 16 is the better since the intent is for the head mount to provide all the flexibility for head movement and for beam 16 to provide none. Thus, head support arm 16 is simply a generally rectangular, elongate member having various cutouts therein for receipt of the various components mounted thereon, as will be described more fully hereinafter. As shown in FIGS. 1 and 2, opposite support arms 16 can be bolted together by means of bolts 17, with a spacer 18 therebetween, the ends of arms 16 adjacent bolts 17 and spacer 18 being connected to the movable carriage (not shown) in any desirable manner well known to those skilled in the art.

Figure 10:
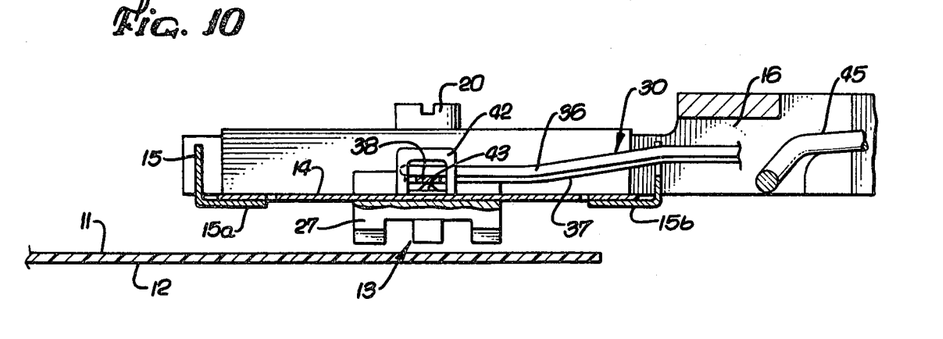
FIG. 10 is an enlarged sectional view taken along the line 10—10 in FIG. 9.

The free end of arm 16 incorporates two elongate arm extensions 19a and 19b between which frame 15 is mounted. Frame 15 is preferably formed from a single, thin, approximately square piece of resilient material, such as steel, having a central rectangular cut-out area in which gimbal sheet 14 is mounted. Frame 15 has, integral with itself and projecting inwardly therefrom, on opposite sides, a pair of mounting tabs 15a and 15b (FIG. 10) on which opposite sides of gimbal sheet 14 rest. The remaining opposite sides of frame 15 have mounting holes by which frame 15 may be connected to arm extensions 19a and 19b by means of screws 20.

Gimbal sheet 14 is shown most clearly in FIG. 2 and, for the purposes of the present invention, may be considered to be identical to the gimbal sheet shown in the Beecroft patent and reference to such patent should be made for a further discussion thereof. In any event, gimbal sheet 14 includes outer and inner rings 21 and 22, respectively, the inner edge of outer ring 21 being defined by a pair of "C"-shaped cut-out areas 23a and 23b oriented so that the arms of each are directed towards the other. A pair of webs 24a and 24b are defined between the ends of the arms of cut-out areas 23a and 23b, integral with outer ring 21. Inner ring 22 has the outer edge thereof defined by the inner edges of cut-out areas 23a and 23b. Between and defined by cut-out areas 25a and 25b is a bridge 26 to which transducer head assembly 13 may be attached. Attachment of head assembly 13 to bride 26 may be done with suitable epoxy-type glue or mechanical swaging of bridge 26 into a slot in slider 27.

Transducer assembly 13 should be of low mass and have a low loading force. It is preferably built as a "composite" transducer, a term common to this industry. That is, head assembly 13 is preferably composed of slider 27, which may be made of barium titanate or other suitable long-wearing ceramic, and ferrite transducer element 28, shown in outline only, which is glass-bonded into slider 27. Slider 27 is mounted in gimbal sheet 14, the operation of which is well known to those skilled in the art.

Preferably, gimbal sheet 14 is symmetrical about both pitch and roll axes. The roll axis is in the plane of gimbal sheet 14 and parallel to the direction of rotation of disc 12. The pitch axis is perpendicular to the roll axis and parallel to the direction of movement of arm 16 as arm 16 moves head assembly 13 radially across recording surface 11. An axis, designated Z, is perpendicular to the plane of gimbal sheet 14.

A force F applied to gimbal sheet 14 in the direction of the Z axis will cause deflection thereof along this axis. If gimbal sheet 14 is made relatively thin, the spring rate in the Z direction is very low. Gimbal sheet 14 is also free to rotate around pitch and roll axes. On the other hand, gimbal sheet 14 is ideally constrained from translational movement in the plane of sheet 14 and from rotation around the Z axis. A more complete discussion of the construction and operation of gimbal sheet 14 may be found in copending application Ser. No. 321,336, filed Nov. 16, 1981, and entitled "Gimbal Assembly for Flying Magnetic Transducer Heads", and assigned to DMA Systems Corporation, the assignee of the present application.

Figures 6, 7:
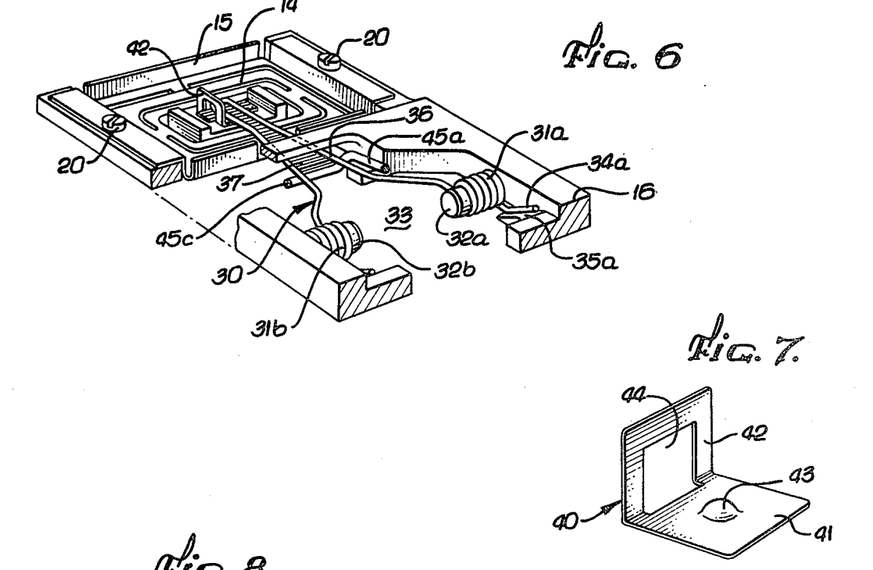
FIG. 6 is an enlarged, partial perspective view of the free end of the cantilevered arm showing the head load spring.
FIG. 7 is an enlarged perspective view of the retractor bracket.

Head assembly 13 is carried by gimbal sheet 14 so that during normal operation, transducer element 28 is positioned extremely close to recording surface 11 (FIGS. 3, 8, 9 and 10). Head assembly 13 is urged toward surface 11 by the action of a head load coil spring 30 (FIGS. 2 and 6). Spring 30 is a generally U-shaped member having coils 31a and 31b adjacent the free ends thereof mounted on pins 32a and 32b extending into a central cut-out area 33 in arm 16. Spring 30 has static spring arms 34a and 34b which bear against surfaces 35a and 35b, respectively, of arm 16. Spring 30 has a central, movable arm 36 which applies the force to head assembly 13. More specifically, and as shown most clearly in FIGS. 2, 6, 9 and 10, a shim 37, which is essentially a thin, flat member, is secured to the bottom of arm 36 of spring 30. The end of shim 37 which applies the force to head assembly 13 has a pair of laterally extending lift fingers 38 made integral therewith, the purpose of which will appear more fully hereinafter.

Figure 9:
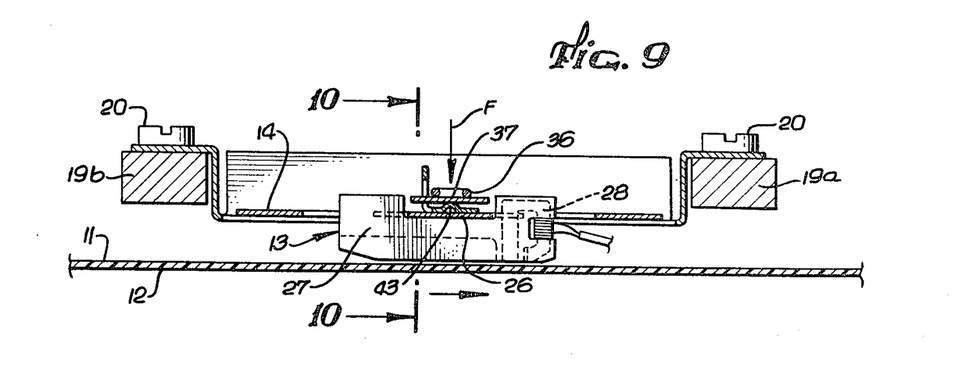
FIG. 9 is an enlarged sectional view taken along the line 9—9 in FIG. 8.

A retractor bracket, generally designated 40 (FIG. 7), is secured to bridge 26 of gimbal sheet 14. Bracket 40 is an L-shaped member having legs 41 and 42. Leg 41 is the side connected to bridge 26 (FIG. 9) and has a central dimple 43. Bracket 40 is connected to bridge 26 so that dimple 43 is coaxial with the center of force of head assembly 13. Shim 37 actually makes contact with dimple 43 so that the force F is applied to head assembly 13 at dimple 43 (FIG. 9).

Leg 42 is formed into a lift bail by a central cut-out area 44, lift bail 42 extending perpendicularly to bridge 26 and shim 37 when mounted on bridge 26. For reasons which will appear more fully hereinafter, one of lift fingers 38 extends into cut-out area 44. It should also be mentioned that since bracket 40 has only one lift bail 42, only one lift finger 38 is really required. However, when shim 37 is used on an inverted support apparatus 10, as shown in FIG. 1, the opposite lift finger 38 will be required. Thus, in order to make apparatus 10 useful regardless of its relative orientation, shim 37 has a pair of opposed lift fingers 38.

With the apparatus just described, movable spring arm 36 and shim 37 attached thereto bear against dimple 43 on leg 41 of bracket 40 and thereby transmit force F to head assembly 13, such force being necessary to hold head assembly 13 close to recording surface 11 to counteract the force of the air bearing between the two and to permit efficient data recording. As disclosed more fully in the beforementioned copending application, gimbal sheet 14 provides head assembly 13 with desired freedom of movement in roll and pitch and in the Z direction to permit head assembly 13 to track very closely to recording surface 11, with a spacing of less than 20 microinches.

Support apparatus 10 also includes means for lifting head assembly 13 away from recording surface 11. This means includes an elongate lift member, generally designated 45, made from a reentrant length of wire. In a horizontal plane, shown in FIG. 2, lift wire 45 is a rectangular member and has opposed sides 45a and 45b and opposed sides 45c and 45d. The appearance of lift wire 45 in a vertical plane is seen most clearly from an inspection of FIGS. 8 and 11. Lift wire 45 is supported by a flexure 46 (FIG. 5), which has the general appearance of a tuning fork, including arms 46a and 46b and a base 46c. Base 46c is secured to a rigid support 47, such as by being spot welded thereto, support 47 having a pair of holes 47a and 47b therein which are alignable with corresponding holes in head support arm 16. A pair of screws 48 permit connection of support 47 to arm 16.

Figure 8:
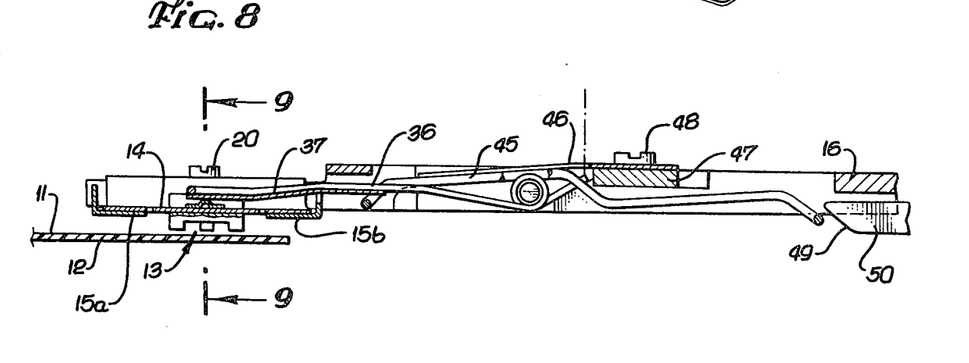
FIG. 8 is an enlarged sectional view, similar to FIGS. 3 and 4, showing the head assembly in its loaded position.

As shown most clearly in FIGS. 1, 2 and 8, sides 45a and 45b of lift wire 45 are bent and dimensioned so as to engage arms 46a and 46b, respectively, of flexure 46, the two members being adapt to be connected together, such as by spot welding. Thus, flexure 46 supports lift wire 45 for pivotal movement about an axis X (FIG. 2) which is parallel to the longitudinal dimension of support 47 and perpendicular to support arm 16.

Figure 4:
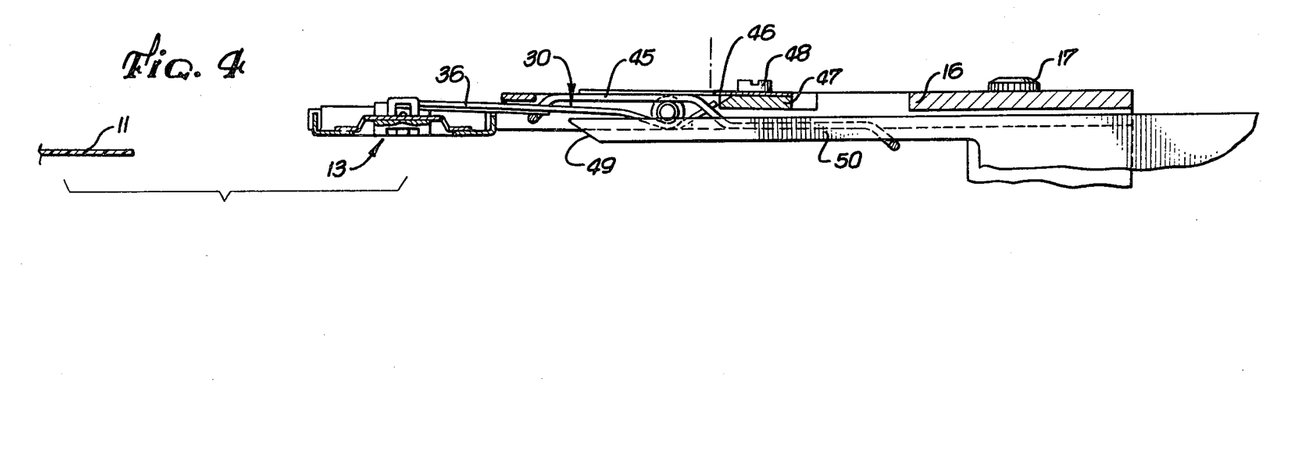

Sides 45a and 45b of lift wire 45 extend above movable arm 36 of head load spring 30 and then are bent downwardly so that side 45c extends below movable arm 36. This is clearly shown in FIGS. 2–4. In the loaded position of head assembly 13, with shim 37 bearing on bracket 40, side 45c of lift wire 45 is spaced below shim 37. This is the position of lift wire 45 shown in FIGS. 3 and 8. The other end 45d of lift wire 45 extends rearwardly in position to engage a caming surface 49 at the end of a retractor actuating arm 50. Arm 50 is connected to a rigid support (not shown) and is centrally located relative to arm 16 (FIG. 2), coaxial with the longitudinal axis thereof. Arm 50 is adapted to remain stationary as arm 16 moves. Caming surface 49 is positioned at the end of arm 50 and aligned with side 45d of lift wire 45 and adapted to engage side 45d as head assembly 13 passes the outwardmost recording track on surface 11.

Figure 11:
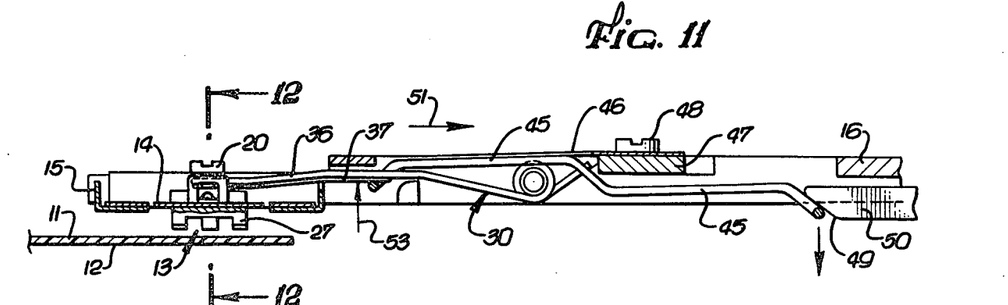
FIG. 11 is a sectional view like FIG. 8 but showing initial retraction of the head assembly.
Figure 12:
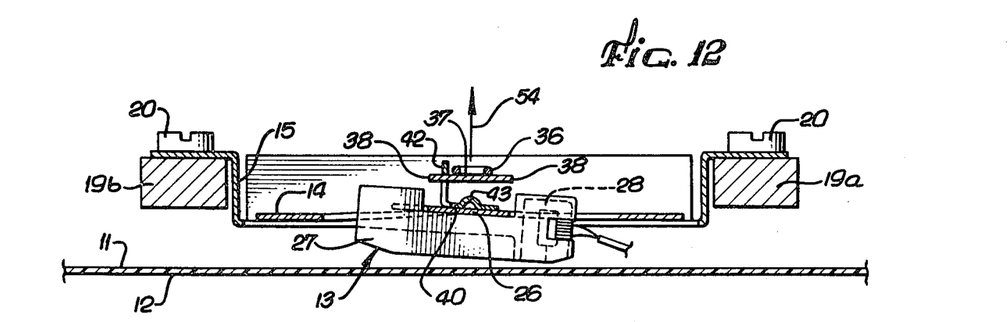
FIG. 12 is a sectional view like FIG. 9 but showing initial retraction of the head assembly.

The loaded position of head assembly 13 is shown in FIGS. 3 and 8–10 and, in this position, it is seen that side 45d of lift wire 45 is spaced from caming surface 49, side 45c of lift wire 45 is spaced from shim 37, and shim 37 is applying its dowward force F to head assembly 13. When it is desired to retract head assembly 13 from recording surface 11, head support arm 16 moves radially, to the right in FIG. 2, until side 45d of lift wire 45 engages caming surface 49. FIG. 8 shows side 45d of lift wire 45 about to engage caming surface 49. It should be obvious from a comparison of FIGS. 8 and 11 that as arm 16 moves to the right, as indicated by arrow 51, arm 45d contacts caming surface 49 and is moved in the direction of arrow 52 in FIG. 11. This causes pivoting of lift wire 45 about axis X. The result is that side 45c of lift wire 45 moves in the direction of arrow 53 shown in FIG. 11. This does several things. First of all, as shown in FIGS. 11 and 12, this removes shim 37 off of dimple 43, removing the downward force F from head assembly 13. Secondly, as shim 37 moves upwardly, lift finger 38 engages lift bail 42 and applies a force thereto in the direction of arrow 54 (FIG. 12). This force is in a direction so as to move head assembly 13 away from recording surface 11.

It should be particularly noted that since lift bail 42 is spaced from the center of force of head assembly 13 (which is aligned with dimple 43), a positive attitude pitch rotation is induced in head assembly 13, clearly shown in FIG. 12. It should be noted that the flexure center of resistance of gimble sheet 14 is also aligned with the center of force. Roll rotation of head assembly 13 is restrained since the flat portion of lift finger 38 is in contact with the top of lift bail 42.

Several aspects of the present invention should be particularly noted. First of all, the present invention provides for complete separation of function between load, retract and flying. This separation provides for positive control of air bearing attitude during both load and retract, while avoiding the addition of unwanted biases during flying. It will be noted from an inspection of FIGS. 9 and 10 that lift finger 38 is completely out of contact with retractor bracket 40 during flying so as not to influence flying at all. Gimbal sheet 14 is in a nominally flat configuration, providing maximum stiffness in the plane thereof, while applying no pitch and roll bias to the air bearing. Furthermore, shim 37 applies the loading force F to a precise point, dimple 43, so as to be aligned with the center of force of head assembly 13.

During retract, shim 37 moves out of contact with dimple 43 to remove the loading force from head assembly 13. Simultaneously, lift finger 38 engages lift bail 42, lifting head assembly 13 and causing the leading edge thereof to pitch upwardly. It should be obvious that during loading of head assembly 13, head assembly 13 is loaded with the same pitch orientation, which further enhances the flying ability of head assembly 13 above recording surface 11. It is therefore seen that the loading function and retraction function are totally independent.

The present invention also employs a caming surface 49 on an actuator arm 50 mounted on the centerline of arm 16. The central area of arm 16 is required in any event and normally plays no useful role in conventional arm assemblies. This otherwise wasted space is now effectively used while achieving two additional and important features. First of all, there is now a symmetrical lift force so that there is no twisting imparted to head support arm 16. Furthermore, space conservation is maximized since no additional arm width is required for external cams and followers.

While the invention has been described with respect to the preferred physical embodiment constructed in accordance therewith, it will be apparent to those skilled in the art that various modifications and improvements may be made without departing from the scope and spirit of the invention. Accordingly it is to be understood that the invention is not to be limited by the specific illustrative embodiment, but only by the scope of the appended claims.

We claim:

1. Apparatus for supporting a magnetic head assembly adjacent a recording surface for transcribing thereon, comprising:
    a cantilevered support arm;
    a resilient member attached to the free end of said support arm;
    a magnetic head assembly carried by said resilient member;
    a lift bail connected to said head assembly;
    a force arm attached to said support arm for applying a force to said head assembly on the side thereof opposite to the transducing side thereof;
    a lifting finger attached to said force arm at the point where said force arm engages said head assembly, said lifting finger extending into but not engaging said lift bail when said force arm is engaging said head assembly; and
    means for moving said force arm out of contact with said head assembly to remove said force therefrom, said lifting finger engaging said lift bail when said force arm is moved to simultaneously move said head assembly away from said recording surface, said lift bail being spaced laterally from the point where said force arm applies said force to said head assembly so as to provide for different locations for load force and retract force.

2. Apparatus for supporting a magnetic head assembly adjacent a recording surface for transcribing thereon, comprising:
    a cantilevered support arm;
    a resilient member attached to the free end of said support arm;
    a magnetic head assembly carried by said resilient member;
    a lift bail connected to said head assembly;
    a force arm attached to said support arm for applying a force to said head assembly on the side thereof opposite to the transducing side thereof;
    a lifting finger attached to said force arm at the point where said force arm engages said head assembly, said lifting finger extending into but not engaging said lift bail when said force arm is engaging said head assembly; and
    means for moving said force arm out of contact with said head assembly to remove said force therefrom, said lifting finger engaging said lift bail when said force arm is moved to simultaneously move said head assembly away from said recording surface, said lift bail being located so that said lifting finger pivots said head assembly as it lifts same whereby the leading edge of said head assembly is tilted upwardly.

3. Apparatus according to claim 1 or 2, wherein said force arm applies said force to said head assembly at the center of force of the air bearing produced by rotation of said recording surface.

4. Apparatus according to claim 1 or 2, wherein said means for moving said force arm out of contact with said head assembly comprises:
    an arm pivotally mounted on said support arm, one end of said pivot arm being adapted to engage said force arm; and
    an actuator arm including a caming surface positioned to engage the other end of said pivot arm.

5. Apparatus according to claim 4, wherein said actuator arm is centrally mounted within said support arm.

6. Apparatus according to claim 4, wherein said actuator arm is coaxial with said support arm.

7. Apparatus for supporting a magnetic head assembly adjacent a recording surface for transcribing thereon, comprising:
    a cantilevered support arm;
    a magnetic head assembly;
    resilient means for connecting said magnetic head assembly to the free end of said support arm;
    retractor means connected to said head assembly;
    a force arm attached to said support arm for applying a force to said head assembly on the side thereof opposite to the transducing side thereof;
    means connected to said force arm for engaging said retractor means, said engaging means being disengaged from said retractor means when said force arm is applying said force to said head assembly; and
    means for moving said force arm out of contact with said head assembly to remove said force therefrom, said engaging means engaging said retractor means when said force arm disengages from said head assembly to move said head assembly away from said recording surface, said retractor means being spaced laterally from the point where said force arm applies said force to said head assembly so as to provide for different locations for load force and retract force.

8. Apparatus for supporting a magnetic head assembly adjacent a recording surface for transcribing thereon, comprising:
    a cantilevered support arm;
    a magnetic head assembly;
    resilient means for connecting said magnetic head assembly to the free end of said support arm;
    retractor means connected to said head assembly;
    a force arm attached to said support arm for applying a force to said head assembly on the side thereof opposite to the transducing side thereof;
    means connected to said force arm for engaging said retractor means, said engaging means being disengaged from said retractor means when said force arm is applying said force to said head assembly; and means for moving said force arm out of contact with said head assembly to remove said force therefrom, said engaging means engaging said retractor means when said force arm disengages from said head assembly to move said head assembly away from said recording surface, said retractor means being positioned so that said engaging means pivots the leading edge of said head assembly upwardly as it lifts same.

9. Apparatus according to claim 8, wherein said force arm moving means comprises:
  arm means pivotally mounted on said support arm, one end of said arm means being adapted to engage said force arm; and
  an actuator arm including a caming surface positioned to engage the other end of said arm means, said actuator arm being centrally mounted within said support arm.

10. Apparatus according to claim 9, wherein said actuator arm is coaxial with said support arm.

* * * * *